(12) United States Patent
Sasaki

(10) Patent No.: US 11,333,092 B2
(45) Date of Patent: May 17, 2022

(54) CONTROL DEVICE AND CONTROL METHOD FOR INTERNAL COMBUSTION ENGINE

(71) Applicant: DENSO CORPORATION, Kariya (JP)

(72) Inventor: Ryota Sasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 15 days.

(21) Appl. No.: 17/104,862

(22) Filed: Nov. 25, 2020

(65) Prior Publication Data

US 2021/0079862 A1   Mar. 18, 2021

Related U.S. Application Data

(63) Continuation of application No. PCT/JP2019/019336, filed on May 15, 2019.

(30) Foreign Application Priority Data

May 31, 2018 (JP) .............................. JP2018-104869

(51) Int. Cl.
| | |
|---|---|
| *F02D 41/14* | (2006.01) |
| *F02D 41/00* | (2006.01) |
| *F02D 41/38* | (2006.01) |
| *F02P 5/14* | (2006.01) |

(52) U.S. Cl.
CPC ..... *F02D 41/1454* (2013.01); *F02D 41/0002* (2013.01); *F02D 41/38* (2013.01); *F02P 5/14* (2013.01); *F02D 2041/389* (2013.01)

(58) Field of Classification Search
CPC ............. F02D 41/0002; F02D 41/0007; F02D 41/1454; F02D 41/1497; F02D 41/1498; F02D 41/30; F02D 41/3011; F02D 41/3064; F02D 41/307; F02D 41/3076; F02P 5/04; F02P 5/045; F02P 5/145
USPC ....... 701/103, 104, 111; 123/406.23–406.26, 123/406.45, 406.47
See application file for complete search history.

(56) References Cited

U.S. PATENT DOCUMENTS

| | | | |
|---|---|---|---|
| 5,735,244 A  * | 4/1998 | Machida | F02D 41/0225 123/399 |
| 10,221,799 B2 * | 3/2019 | Tanaka | F02D 41/34 |

(Continued)

FOREIGN PATENT DOCUMENTS

JP         2016-138497         8/2016

*Primary Examiner* — Robert A Werner
(74) *Attorney, Agent, or Firm* — Nixon & Vanderhye P.C.

(57) ABSTRACT

An acquisition unit acquires a required torque and an operating state of an internal combustion engine. A control unit is configured to: control operation of the internal combustion engine by using a required air amount, a required fuel amount, and a required ignition timing; acquire a required air amount by using the acquired required torque and a target air-fuel ratio of an air system determined according to the operating state; perform torque fluctuation correction on the target air-fuel ratio of the air system to determine a target air-fuel ratio of an injection system to reduce a difference between the required torque and an actual torque in a transition period between stoichiometric combustion and lean combustion; acquire a required fuel amount and a required ignition timing by using the determined target air-fuel ratio of the air system and the determined target air-fuel ratio of the injection system.

10 Claims, 11 Drawing Sheets

(56) References Cited

U.S. PATENT DOCUMENTS

| | | | |
|---|---|---|---|
| 2006/0142924 A1* | 6/2006 | Nakagawa | F02D 41/1497 701/110 |
| 2012/0035834 A1* | 2/2012 | Takahashi | F02D 41/0002 701/105 |
| 2014/0041628 A1* | 2/2014 | Yoshizaki | F02D 11/105 123/402 |
| 2016/0115892 A1* | 4/2016 | Tanaka | F02D 41/0002 123/406.46 |
| 2016/0312734 A1* | 10/2016 | Yoshizaki | F02D 41/1497 |
| 2021/0047978 A1* | 2/2021 | Takayama | F02P 5/1502 |

\* cited by examiner

CONTROL DEVICE AND CONTROL METHOD FOR INTERNAL COMBUSTION ENGINE

CROSS REFERENCE TO RELATED APPLICATION

The present application is a continuation application of International Patent Application No. PCT/JP2019/019336 filed on May 15, 2019, which designated the U.S. and claims the benefit of priority from Japanese Patent Application No. 2018-104869 filed on May 31, 2018. The entire disclosures of all of the above applications are incorporated herein by reference.

TECHNICAL FIELD

The present disclosure relates to a control technique for an internal combustion engine.

BACKGROUND

Conventionally, a known control device manipulates parameters relevant to an operating state of an internal combustion engine to control the operating state.

SUMMARY

According to a first aspect of the present disclosure, a control device for an internal combustion engine includes an acquisition unit configured to acquire a required torque and an operating state of the internal combustion engine; and a control unit configured to control operation of the internal combustion engine by using a required air amount, a required fuel amount, and a required ignition timing. The control unit is configured to: determine a target air-fuel ratio of an air system according to the acquired required torque and the acquired operating condition; acquire the required air amount by using the target air-fuel ratio of the air system; perform torque fluctuation correction on the target air-fuel ratio of the air system to determine a target air-fuel ratio of an injection system to reduce a difference between the required torque and an actual torque when a combustion state of the internal combustion engine is in a transition period between stoichiometric combustion and lean combustion; determine the target air-fuel ratio of the injection system by using the target air-fuel ratio of the air system when the combustion state is not in the transition period; and acquire the required fuel amount and the required ignition timing by using the determined air-fuel ratio of the air system and the determined target air-fuel ratio of the injection system.

The control unit for an internal combustion engine according to the first aspect enables to reduce or eliminate an influence of a delay in response of change in the actual air amount and to suppress or restrict a torque fluctuation in a transition period between stoichiometric combustion and lean combustion.

According to a first aspect of the present disclosure, a method for controlling an internal combustion engine includes: acquiring a required torque and an operating state of the internal combustion engine; determining a target air-fuel ratio of an air system according to the acquired required torque and the acquired operating condition; acquiring the required air amount by using the target air-fuel ratio of the air system; performing torque fluctuation correction on the target air-fuel ratio of the air system to determine a target air-fuel ratio of an injection system to reduce a difference between the required torque and an actual torque when a combustion state of the internal combustion engine is in a transition period between stoichiometric combustion and lean combustion; determining the target air-fuel ratio of the injection system by using the target air-fuel ratio of the air system when the combustion state is not in the transition period; and acquiring the required fuel amount and the required ignition timing by using the determined air-fuel ratio of the air system and the determined target air-fuel ratio of the injection system.

The method for controlling the internal combustion engine according to the second aspect enables to reduce or eliminate an influence of a delay in response of change in the actual air amount and to suppress or restrict a torque fluctuation in a transition period between stoichiometric combustion and lean combustion. The present disclosure may also be realized as a control program for the internal combustion engine or a computer-readable storage medium that stores the program.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
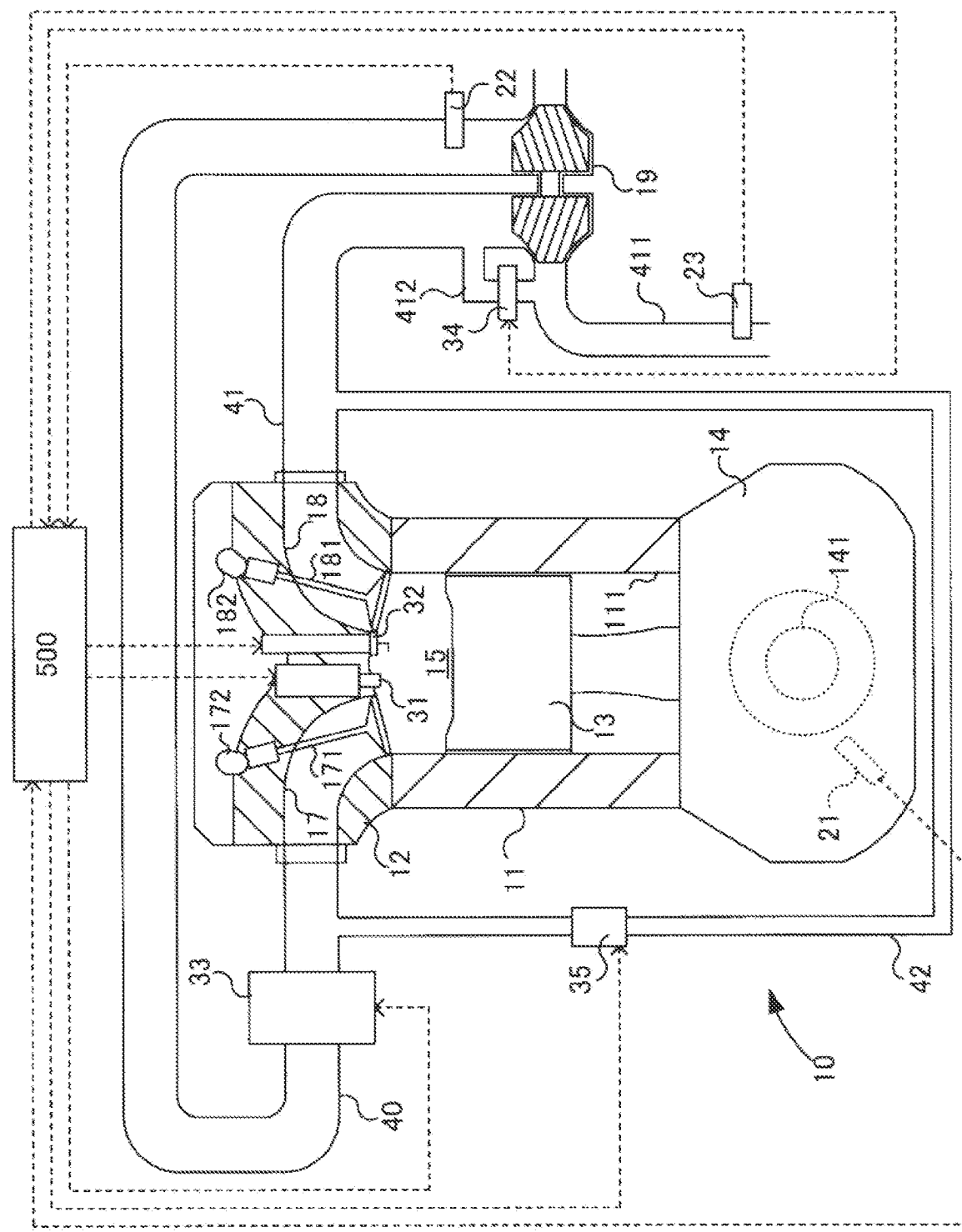
FIG. 1 is an explanatory diagram showing a control device for an internal combustion engine according to a first embodiment and showing an outline of the internal combustion engine to which the control device is applied.

As follows, examples of the present disclosure will be described.

According to an example of the present disclosure, a control device controls an operating state of an internal combustion engine at a target air-fuel ratio. The control device may continuously change a target air-fuel ratio in order to suppress torque fluctuations that occur when an operating state of an internal combustion engine is switched between stoichiometric combustion and lean combustion.

It is noted that, even in a case where the target air-fuel ratio is continuously changed, a response delay may arise in the change in an actual air amount. Therefore, in a transition period in which the combustion state is switched between a lean combustion and a stoichiometric combustion, and the change in the target air-fuel ratio may become relatively large. Therefore, change in the actual amount of air may not follow the target air-fuel ratio, and torque fluctuations may occur. Further, in a case where the air-fuel ratio is continuously changed, an issue may arise that the configuration has to use an air-fuel ratio region, in which the catalyst performance cannot be maintained.

Therefore, it may be desired to reduce or eliminate the influence of the delay in response of the change in the actual air amount and to suppress or restrict the torque fluctuation in the transition period between the stoichiometric combustion and the lean combustion.

According to an example of the present disclosure, a control device for an internal combustion engine includes an acquisition unit configured to acquire a required torque and an operating state of the internal combustion engine; and a control unit configured to control operation of the internal combustion engine by using a required air amount, a required fuel amount, and a required ignition timing. The control unit is configured to: determine a target air-fuel ratio of an air system according to the acquired required torque and the acquired operating condition; acquire the required air amount by using the target air-fuel ratio of the air system; perform torque fluctuation correction on the target air-fuel ratio of the air system to determine a target air-fuel ratio of an injection system to reduce a difference between the required torque and an actual torque when a combustion state of the internal combustion engine is in a transition period between stoichiometric combustion and lean combustion; determine the target air-fuel ratio of the injection system by using the target air-fuel ratio of the air system when the combustion state is not in the transition period; and acquire the required fuel amount and the required ignition timing by using the determined air-fuel ratio of the air system and the determined target air-fuel ratio of the injection system.

The control unit for the internal combustion engine according to the first aspect enables to reduce or eliminate an influence of a delay in response of change in the actual air amount and to suppress or restrict a torque fluctuation in a transition period between stoichiometric combustion and lean combustion.

According to an example of the present disclosure, method for controlling an internal combustion engine includes: acquiring a required torque and an operating state of the internal combustion engine; determining a target air-fuel ratio of an air system according to the acquired required torque and the acquired operating condition; acquiring the required air amount by using the target air-fuel ratio of the air system; performing torque fluctuation correction on the target air-fuel ratio of the air system to determine a target air-fuel ratio of an injection system to reduce a difference between the required torque and an actual torque when a combustion state of the internal combustion engine is in a transition period between stoichiometric combustion and lean combustion; determining the target air-fuel ratio of the injection system by using the target air-fuel ratio of the air system when the combustion state is not in the transition period; and acquiring the required fuel amount and the required ignition timing by using the determined air-fuel ratio of the air system and the determined target air-fuel ratio of the injection system.

The method for controlling the internal combustion engine according to the second aspect enables to reduce or eliminate an influence of a delay in response of change in the actual air amount and to suppress or restrict a torque fluctuation in a transition period between stoichiometric combustion and lean combustion. The present disclosure may also be realized as a control program for the internal combustion engine or a computer-readable storage medium that stores the program.

A control device for an internal combustion engine and a control method for the internal combustion engine according to the present disclosure will be described below according to embodiments.

First Embodiment

Figure 2:
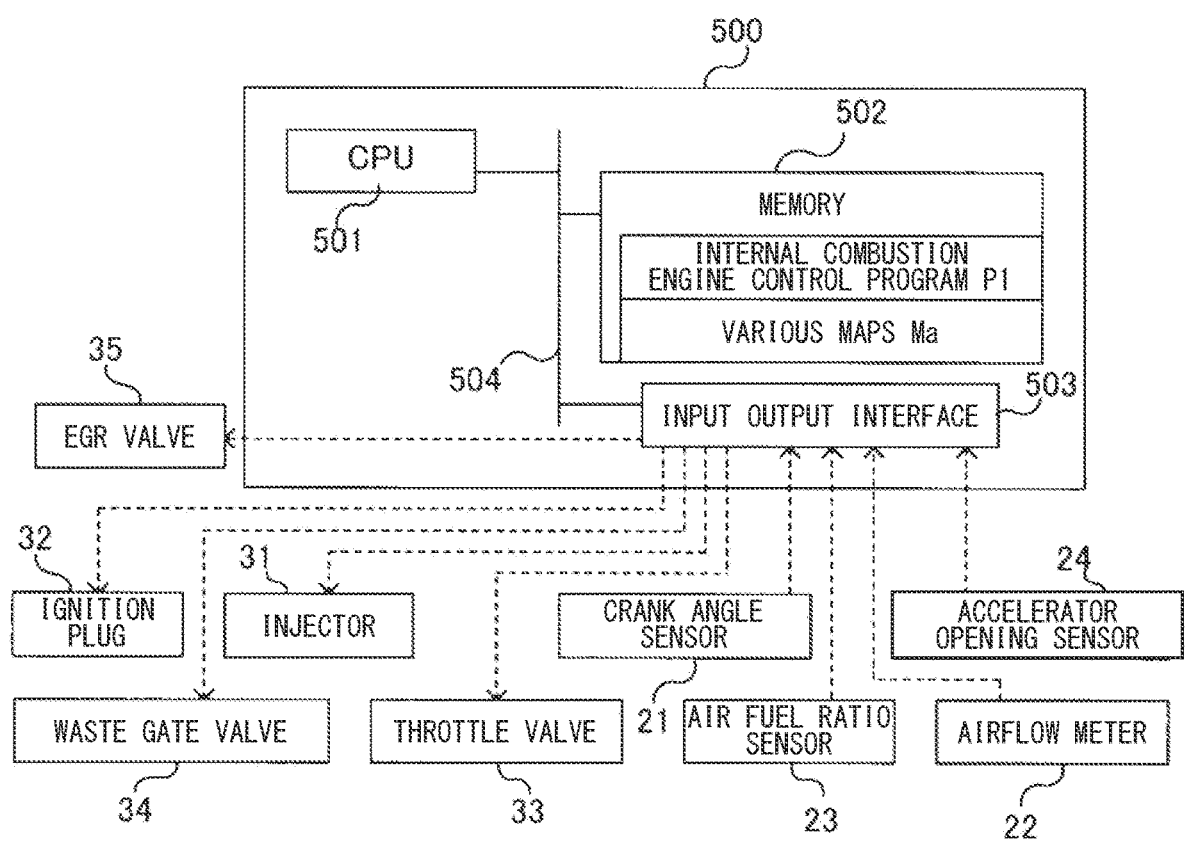
FIG. 2 is a block diagram showing a functional configuration of the control device for the internal combustion engine according to the first embodiment.

As shown in FIGS. 1 and 2, an internal combustion engine 10 to which an internal combustion engine control device 500 according to a first embodiment is applied includes a cylinder block 11, a cylinder head 12, a piston 13, and a crank housing 14. The internal combustion engine 10 is a so-called gasoline engine that uses gasoline as fuel and burns air-fuel mixture with spark ignition. The cylinder block 11 has multiple tubular cylinders 111 and pistons 13 which are inserted in the cylinders 111, respectively. A combustion chamber 15 is defined by the cylinder 111, the cylinder head 12, and a top surface of the piston 13. The cylinder head 12 is mounted on an upper side of the cylinder block 11. A crank housing 14 is arranged on the lower side of the cylinder block 11. A crank housing 14A is provided with a crankshaft 141 and a crank angle sensor 21 which are shown by a hidden line. The lower side of the cylinder block 11 is on the side where the crankshaft 141 is located in the internal combustion engine 10. The upper side of the cylinder block 11 is on the side where the crankshaft 141 is not located and where a camshaft (not shown) for driving cams 172 and 182 is arranged.

The cylinder head 12 has an intake port 17, which is an intake passage for introducing intake air into the cylinder 111, and an exhaust port 18 which is an exhaust passage for exhausting exhaust gas from the cylinder 111. An intake valve 171 that is opened and closed with the cam 172 is provided to the intake port. An exhaust valve 181 that is opened and closed with the cam 182 is provided to the exhaust port 18. At least one of the intake valve 171 and the exhaust valve 181 may be provided with a variable valve mechanism that changes the valve opening timing and a valve closing timing and the valve lift amount.

An injector 31 and a spark plug 32 are provided between the intake port 17 and the exhaust port 18 in the cylinder head 12. The injector 31, that is, the fuel injection device causes an actuator such as a solenoid or a piezo element to drive a plunger in response to a control signal input from the control device 500 to spray fuel, such as gasoline, from one or more injection holes The injector 31 is an in-cylinder injection type injector that sprays fuel directly into the combustion chamber 15 from the injection hole that is exposed in the combustion chamber 15. The injector 31 is configured to supply fuel into the combustion chamber 15 regardless of a valve opening timing of the intake valve 171. The injector 31 may be a port injection type injector that is arranged in an intake manifold 40 and injects fuel toward the intake port 17. The spark plug 32 has a ground electrode and a center electrode, which are spark ignition portions exposed in the combustion chamber 15. The spark plug 32 is applied with a high voltage from a direct ignition coil in response to an ignition control signal input from the control device 500. As a result, the spark plug 32 generates a spark between the ground electrode and the center electrode, thereby to cause spark ignition of fuel.

Intake air is supplied to the intake port 17 through the intake manifold 40, and exhaust gas is discharged from the exhaust port 18 through an exhaust manifold 41. One end of the intake manifold 40 is connected to the intake port 17, and the other end of the intake manifold 40 is connected to a compressor side of a turbocharger 19. A throttle valve 33 is provided to one end of the intake manifold 40, and an air flow meter 22 is provided to the other end of the intake manifold 40. The throttle valve 33 is provided with, for example, an electric motor as an actuator for adjusting a valve opening degree. One end of an exhaust manifold 41 is connected to the exhaust port 18, and the other end of the exhaust manifold 41 is connected to a turbine side of the turbocharger 19. The compressor side of the turbocharger 19 is communicated with the atmosphere via an air cleaner (not shown). The turbine side of the turbocharger 19 is communicated with the atmosphere via an exhaust gas pipe 411. An air-fuel ratio sensor 23 and an exhaust gas catalyst (not shown) are provided to the exhaust gas pipe 411. On the turbine side of the turbocharger 19, a wastegate pipe 412 and a wastegate valve 34 are provided. The wastegate pipe 412 is to bypass exhaust gas drawn into the turbocharger 19 to the exhaust gas pipe 411. The wastegate valve 34 is for controlling the amount of exhaust gas flowing through the wastegate pipe 412. The throttle valve 33 is provided with, for example, an electric motor as an actuator for adjusting a valve opening degree.

The intake manifold 40 and the exhaust manifold 41 are connected with each other through an exhaust gas recirculation (EGR) pipe 42. An EGR valve 35 for controlling the amount of exhaust gas flowing through the EGR pipe 42 is provided to the EGR pipe 42.

As shown in FIG. 2, the internal combustion engine control device 500 according to the first embodiment includes a central processing unit (CPU) 501, a memory 502, an input and output interface 503, and an internal bus 504. The CPU 501, the memory 502, and the input and output interface 503 are connected to each other via the internal bus 504 to enable communication with each other in both directions. The memory 502 includes a memory, such as a ROM that stores an internal combustion engine control program P1 for controlling the operating state of the internal combustion engine 10 and various maps Ma in a non-volatile and read-only manner. The memory 502 includes a memory, such as a RAM, that is configured to be read and written by the CPU 501.

The CPU 501 functions as a control unit. The CPU 501 develops and executes the internal combustion engine control program P1 stored in the memory 502 in a readable and writable memory. The CPU 501 may be a single CPU, multiple CPUs that execute programs respectively, or a multitasking type CPU that is configured to execute multiple programs at the same time.

The input and output interface 503 functions as an acquisition unit. The input and output interface 503 is connected with the crank angle sensor 21, the air flow meter 22, the air-fuel ratio sensor 23, and an accelerator opening sensor 24 via detection signal lines, respectively. The input and output interface 503 is connected with the injector 31, the spark plug 32, the throttle valve 33, and the wastegate valve 34 via control signal lines, respectively. The input and output interface 503 inputs detection signals from the crank angle sensor 21, the air flow meter 22, the air-fuel ratio sensor 23, and the accelerator opening sensor 24. The input and output interface 503 outputs control signals, such as an injection signal, an ignition signal, and an opening signal, to the injector 31, the spark plug 32, the throttle valve 33, and the wastegate valve 34.

The crank angle sensor 21 is, for example, a magnetic-electric conversion device using a Hall IC and is a sensor for detecting the rotation speed of the crankshaft 141, that is, the engine rotation speed, and the rotation angle of the crankshaft 141. The rotation angle of the crankshaft 141 is used to detect the position of the piston 13 in the cylinder 111 to control the injection timing of the injector 31 and to control the ignition timing of the spark plug 32.

The air flow meter 22 is a sensor, such as, a hot wire type sensor or a Karman vortex type sensor for detecting the intake air amount. It is noted that, in order to detect the intake air amount, an intake air pressure sensor for detecting a pressure of intake air drawn in the intake manifold 40 may be used instead of the air flow meter 22.

The air-fuel ratio sensor 23 is a sensor that detects a concentration of oxygen contained in the exhaust gas and outputs a current value corresponding to the air-fuel ratio of air fuel mixture charged into the internal combustion engine 10.

The accelerator opening sensor 24 is a sensor that detects an amount of depression of an accelerator pedal, that is, the accelerator opening degree. A required torque required by the driver for the internal combustion engine 10 can be acquired by using the detected accelerator opening degree and a predetermined correspondence between the accelerator opening degree and the required torque. Each of the above-mentioned sensors is a sensor for detecting the operating state of the internal combustion engine 10. The operating state of the internal combustion engine 10 is determined by using the detection signal.

A control system 50 of the internal combustion engine includes the internal combustion engine control device 500 according to the first embodiment, the actuators including the injector 31, which are for controlling the operating state of the internal combustion engine 10, and sensors including the crank angle sensor 21, which are for detecting the operating state of the internal combustion engine.

Figure 3:
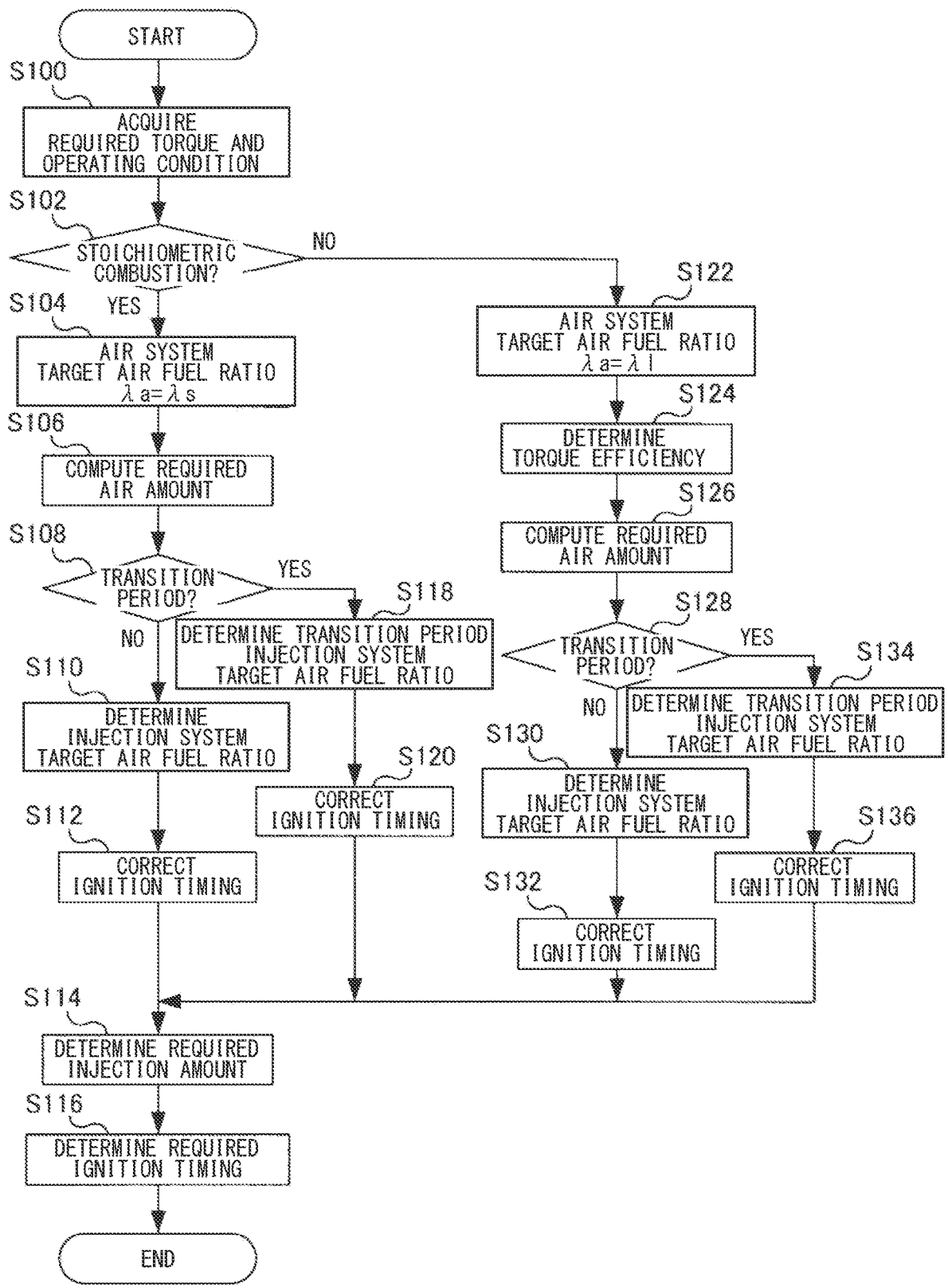
FIG. 3 is a flowchart showing a processing routine of a control process executed by the control device of the internal combustion engine according to the first embodiment for determining a required air amount, a required fuel amount, and a required ignition timing.
Figure 4:
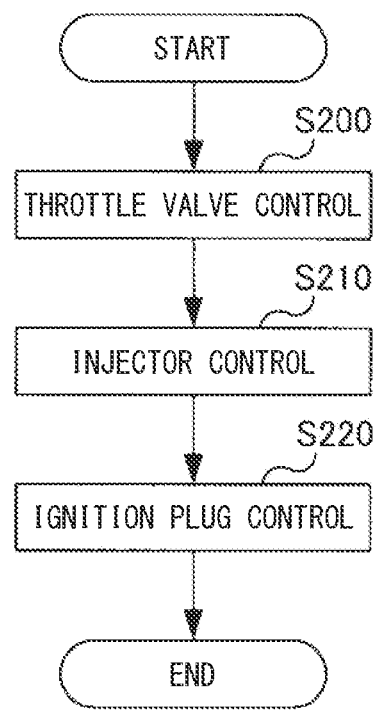
FIG. 4 is a flowchart showing a processing routine of a control process for the internal combustion engine executed by the control device for the internal combustion engine according to the first embodiment.

The control of the internal combustion engine by using the internal combustion engine control device 500 according to the first embodiment will be described. The processing routines shown in FIGS. 3 and 4 are performed by causing the CPU 501 to repeatedly execute the internal combustion engine control program P1 at a predetermined timing after the internal combustion engine 10 is started until the internal combustion engine 10 is stopped. The CPU 501 acquires the operating state and the required torque of the internal combustion engine 10 (step S100). The operating state is acquired via the above-mentioned sensors 21 to 24 and includes the operating state and the operating state of the internal combustion engine 10. Parameters indicating the operating state include, for example, the engine speed, the intake air amount, the accelerator opening degree, and the air-fuel ratio. The required torque is acquired by using the accelerator opening degree detected with the accelerator opening sensor 24 and a predetermined correspondence relationship between the accelerator opening degree and the required torque.

Figure 7:
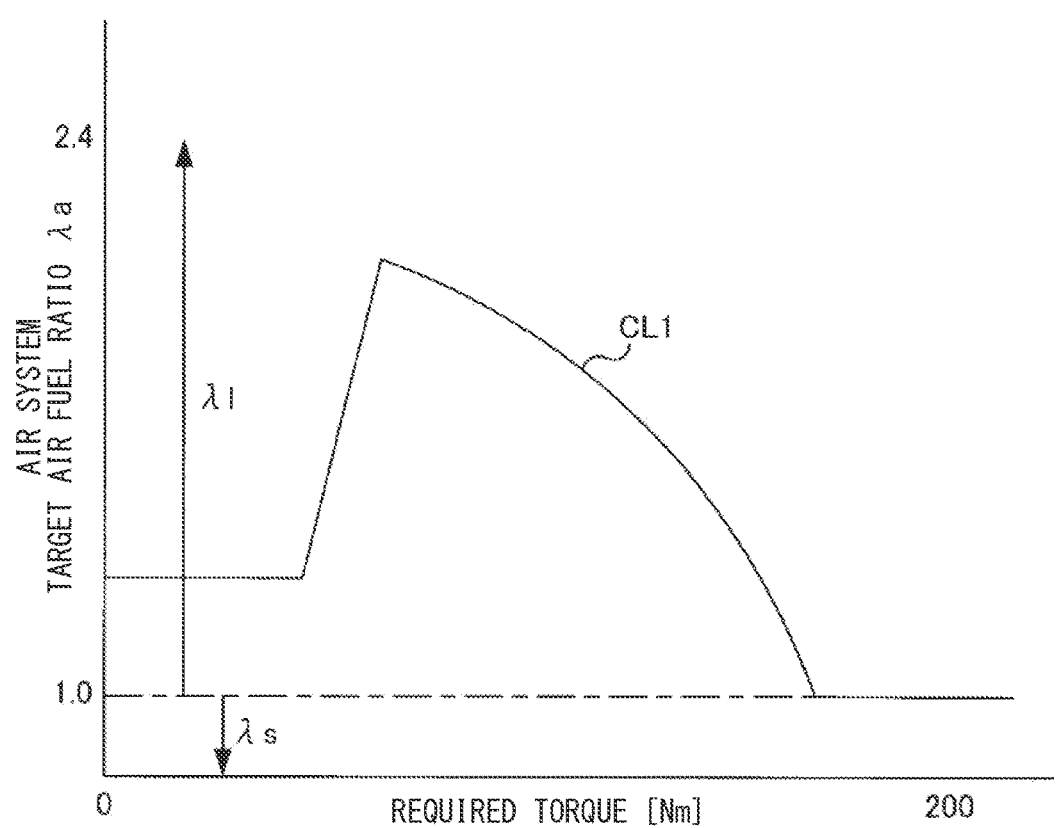
FIG. 7 is an example of a map showing a relationship between the required torque and a target air-fuel ratio of an air system.

The CPU 501 determines the target air-fuel ratio of the air system by using the required torque and the engine speed. The CPU 501 determines whether or not the combustion state of the internal combustion engine 10 determined by using the required torque and the engine speed is stoichiometric combustion (step S102). Specifically, shown in FIG. 7, the target air-fuel ratio $\lambda a$ of the air system is determined with reference to a map that is prepared in advance and that associates the required torque [Nm] with the air system target air-fuel ratio $\lambda a$. A characteristic line CL1 shown in FIG. 7 is an example of a characteristic line corresponding to the acquired engine speed [Ne]. For example, multiple characteristic lines CL1 are prepared corresponding to the engine speed in 100 rpm increments. It is noted that, the numerical values denoted in the map are merely examples for easy understanding. Similarly, in the description of various maps below, the description of "corresponding to the engine speed" represents, for example, the engine speed in 100 rpm increments, and the numerical values denoted in the maps are examples. The target air-fuel ratio $\lambda a$ of the air system as determined is the stoichiometric air-fuel ratio (theoretical air-fuel ratio) $\lambda s=1.0$ or the lean air-fuel ratio $\lambda l>1.0$. The stoichiometric air-fuel ratio $\lambda s$ may include a rich air-fuel ratio and may take a value such as $\lambda s=0.9$ to 0.8. On determining that the combustion state of the internal combustion engine 10 is stoichiometric combustion (step S102: Yes), the CPU 501 determines the stoichiometric air-fuel ratio $\lambda s=1.0$ that has been determined earlier as the target air-fuel ratio $\lambda a$ of the air system (step S104). The CPU 501 acquires a map that is prepared in advance and shows the relationship between the torque corresponding to the stoichiometric air-fuel ratio $\lambda s$ and the required air amount. The CPU 501 acquires the required air amount by using the required torque (step S106). The map showing the relationship between the torque and the required air amount is, for example, a map shown in FIG. 8. Multiple characteristic lines CL2 are prepared according to the engine speed. The required air amount may be acquired according to the engine speed and torque. In order to facilitate the control, it is desirable to use a dimensionless required charging efficiency instead of the required air amount.

The CPU 501 determines whether or not the combustion state of the internal combustion engine is in a transition period from the stoichiometric combustion to the lean combustion (step S108). For example, the CPU 501 may determine that it is in the transition period when the determination of the combustion state in the previous step S102 is the lean combustion or when a reference time has not elapsed since the determination of the lean combustion is made in the previous step S102. When the CPU 501 determines that it is not in the transition period (step S108: No), the CPU 501 determines the target air-fuel ratio $\lambda f$ of the injection system (step S110). Specifically, the same air-fuel ratio as the target air-fuel ratio $\lambda a$ of the air system is set to the target air-fuel ratio $\lambda f$ of the injection system, that is, $\lambda f=\lambda s$. The CPU 501 determines an ignition timing correction value for a base ignition timing (step S112), and the processing routine proceeds to step S114. Specifically, the CPU 501 sets the ignition timing correction value=0 and does not execute retardation correction and advance correction of the ignition timing. When the stoichiometric combustion continues, the operating state of the internal combustion engine 10, that is, the target air-fuel ratio of the air system and the air-fuel ratio of the injection system remain constant or slightly fluctuate. Therefore, large torque fluctuations do not occur, and it is not necessary to reduce the torque by retarding or advancing the ignition timing. In general, the ignition timing control is executed at the MBT, and therefore, the torque cannot be expected to increase due to the further advancement.

The CPU 501 determines the required injection amount (=actual air amount×$\lambda f$) by using the actual air amount and the target air-fuel ratio $\lambda f$ of the injection system (step S114). The CPU 501 adds a retard correction value to the base ignition timing to determine the required ignition timing (step S116) and ends this processing routine. The base ignition timing may use for example, a map that is for determining the ignition timing with the required injection amount and the engine speed as parameters or a map that is for determining the ignition timing with the intake air amount and the engine speed as parameters.

The CPU 501 executes the flowchart shown in FIG. 4 separately from the flowchart shown in FIG. 3. The CPU 501 controls the operation of the internal combustion engine 10 at a timing at which the required air amount, the required injection amount, and the required ignition timing are determined. When the required air amount is determined, the CPU 501 controls the throttle valve 33 by using the required air amount (step S200). Specifically, the CPU 501 determines the throttle valve opening degree corresponding to the determined required air amount by using a map, which defines a characteristic line showing a relationship between the required air amount and the throttle valve opening degree and which is prepared in advance according to the engine speed. The CPU 501 drives the throttle valve 33 according to the determined opening degree. As a result, in each processing step after step S104 or S124 of FIG. 3, the actual air amount corresponding to the operation of the throttle valve 33 may be used.

When the required injection amount is determined, the CPU 501 controls the injector 31 by using the required injection amount (step S210). Specifically, the CPU 501 drives the injector 31 according to a number of injections and an injection timing predetermined in advance corresponding to the operating state of the internal combustion engine 10 to cause the injector 31 to inject fuel by a determined required fuel amount into the combustion chamber 15 during one stroke. When the required ignition timing is determined, the CPU 501 executes a control of the spark plug 32 according to the required ignition timing (step S220) and ends this processing routine. Specifically, the CPU 501 applies a voltage to the spark plug 32 once or multiple times according to the determined required ignition timing and causes a spark in the combustion chamber 15 to ignite air-fuel mixture. As a result, a drive torque is output from the crankshaft 141 of the internal combustion engine 10, and the drive torque is transmitted to the drive wheels via drive trains such as a transmission and a drive shaft.

Figure 5:
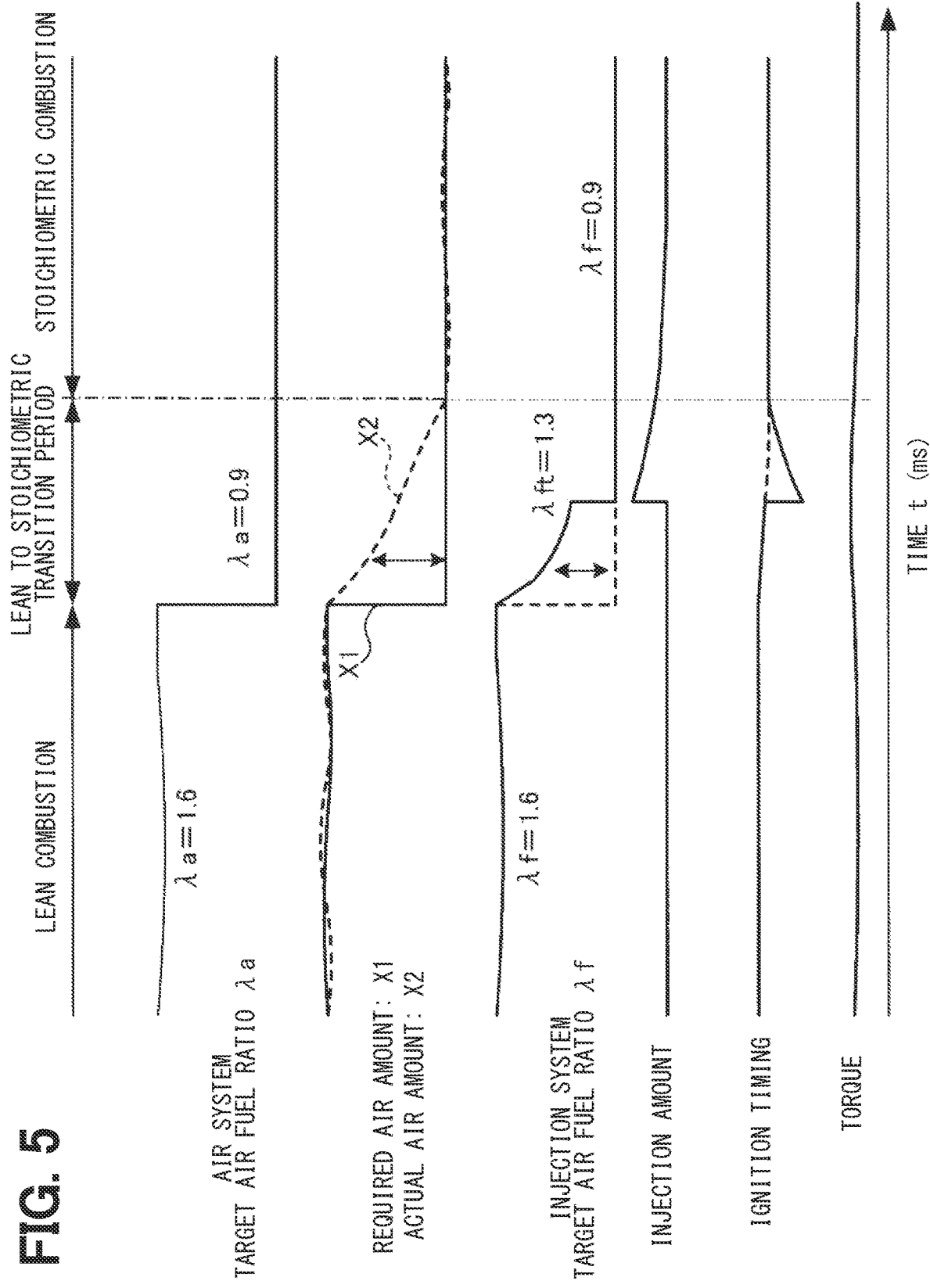
FIG. 5 is a timechart showing timewise changes in various parameters when a combustion state of the internal combustion engine shifts from lean combustion to stoichiometric combustion.
Figure 6:
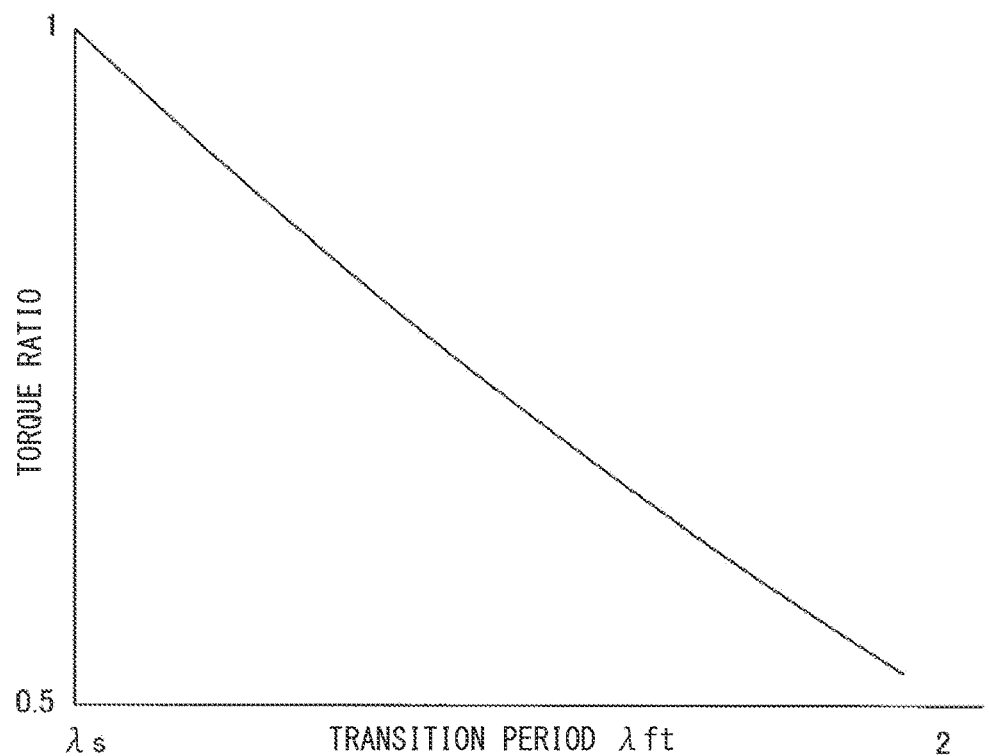
FIG. 6 is an example of a map showing a relationship between a torque ratio and a target air-fuel ratio of the injection system in a transition period.

Returning to FIG. 3, description will be continued. When the CPU 501 determines in step S108 that it is in the transition period (step S108: Yes), the CPU 501 determines the target air-fuel ratio $\lambda ft$ of the injection system in the transition period (step S118). As shown in FIG. 5, the transition period determined in step S108 corresponds to the transition period from the lean combustion to the stoichiometric combustion. The target air-fuel ratio $\lambda$ft of the injection system in the transition period is determined by performing a torque fluctuation correction on the target air-fuel ratio $\lambda$a of the air system in order to reduce the difference between the required torque and the actual torque. Specifically, the CPU 501 computes a ratio of the required torque to the actual torque as a correction torque ratio (required torque/actual torque). The CPU 501 determines the target air-fuel ratio $\lambda$ft of the injection system in the transition period by using the map shown as an example in FIG. 6 prepared in advance. The map shows a relationship between the torque ratio and the target air-fuel ratio $\lambda$ft of the injection system in the transition period. In the relationship between the torque ratio and the target air-fuel ratio $\lambda$ft of the injection system in the transition period, the engine speed may be ignored as a factor. The actual torque is an actual torque output from the internal combustion engine 10 according to an actual amount of air acquired by using the air flow meter 22. The required torque is a target torque to be output by the internal combustion engine 10 acquired in step S100. The relationship between the actual torque and the actual air amount is stored in advance as a map. The actual torque can be acquired by using the map and the actual air amount. The actual torque in the map is a torque output from the internal combustion engine 10 under the condition that the air-fuel ratio $\lambda$s is stoichiometric and the ignition timing is MBT (minimum advance for best torque) at which the torque is maximum. The correction torque ratio may be simply computed by using the required air amount instead of the required torque and by using the actual air amount instead of the actual torque. The required torque and the required air amount have a high correlation with each other. The actual torque and the actual air amount have a high correlation with each other. Therefore, the value of required torque/actual torque and the value of required air amount/actual air amount may be deemed as equal to each other.

As shown in FIG. 5, during the transition period, even when the target air-fuel ratio $\lambda$a of the air system is set to a value from 1.6 in a lean region to 0.9 in a stoichiometric region, a response delay arises in the change in the actual air amount X2. Therefore, there is a gap between the actual air amount X2 and the required amount of air X1, that is, there is a period in which air is in an excessive amount. Therefore, in a case where the target air-fuel ratio $\lambda$f of the injection system is immediately set to the target air-fuel ratio $\lambda$a of the air system, an actual torque larger than the required torque is output, and therefore, torque fluctuations due to the increase in the torque occur. Therefore, during the transition period from the lean combustion to the stoichiometric combustion, the CPU 501 performs torque fluctuation correction to lean the target air-fuel ratio $\lambda$a of the air system and determines the target air-fuel ratio $\lambda$ft of the injection system in the transition period. The CPU 501 suppresses the increase in the torque that occurs, that is, executes the torque down. In the transition period from the lean combustion to the stoichiometric combustion, it becomes that the actual air amount >the required air amount as described above, and therefore, the corrected torque ratio becomes less than 1. The target air-fuel ratio $\lambda$ft of the injection system in the transition period decreases to the target air-fuel ratio fa of the air system as the time elapses. In addition, in the example shown in FIG. 5, in order to avoid a condition where the target air-fuel ratio $\lambda$f of the injection system becomes a value in which the NOx storage reduction catalyst cannot occlude NOx, for example, $1.0<\lambda f<1.3$, in step S118, when the target air-fuel ratio $\lambda$ft of the injection system in the transition period decreases below 1.3, an air-fuel ratio limit is performed to set the target air-fuel ratio $\lambda$ft of the injection system in the transition period to 1.0. It is noted that, when the air-fuel ratio limitation is performed, the injection amount increases as shown in FIG. 5. Therefore, the torque increase due to the gap between the actual air amount and the required air amount caused by the leaning of the target air-fuel ratio $\lambda$f of the injection system cannot be suppressed. Therefore, as described below, the ignition timing is retarded to perform torque reduction.

The CPU 501 executes ignition timing correction by using the determined target air-fuel ratio $\lambda$ft of the injection system in the transition period (step S120), executes steps S114 and S116, and ends the processing routine. In the determination of the ignition timing correction value, the retard correction value is determined by using the correction torque ratio as in the case of the target air-fuel ratio $\lambda$ft of the injection system in the transition period. Specifically, a relationship between the correction torque ratio and the retard correction value is prepared in advance as a map, and the retard correction value is determined by using the computed correction torque ratio. The map showing the relationship between the correction torque ratio and the retard correction value has multiple characteristic lines corresponding to the target air-fuel ratio $\lambda$ft of the transitional period injection system. The retard correction value is determined by using the characteristic line, which corresponds to the target air-fuel ratio $\lambda$ft of the transitional period injection system at the time of determination, and correction torque ratio. In the map showing the relationship between the correction torque ratio and the retard correction value, the retard correction value is 0 in the region where the target air-fuel ratio $\lambda$ft of the injection system of the transition period is 1.3 Aft. Alternatively, the retard correction value may be determined only in the region where the target air-fuel ratio Aft of the injection system of the transition period is $1.0<\lambda ft<1.3$. As shown in FIG. 5, the retard of the ignition timing is performed until the required air amount X1 and the actual air amount X2 substantially coincide to each other, and the retard amount becomes smaller as the time elapses. It is not necessary to perform the air-fuel ratio limitation that is to avoid the target air-fuel ratio $\lambda$f of the injection system at which the NOx storage reduction catalyst cannot adsorb NOx, to avoid, for example, $1.0<\lambda f<1.3$.

The actual torque used when the correction torque ratio is computed is the torque corresponding to the target air-fuel ratio $\lambda$ft of the transitional period injection system. The map that associates the actual torque with the actual air amount described above corresponds to the stoichiometric air-fuel ratio $\lambda$s. Therefore, a torque efficiency of the torque corresponding to the target air-fuel ratio $\lambda$ft of the transitional period injection system with respect to the torque corresponding to the stoichiometric air-fuel ratio $\lambda$s is computed. The actual air amount is corrected by using the computed torque efficiency, and the actual torque is determined by using the corrected actual air amount. The torque efficiency represents a ratio of the torque value corresponding to the non-stoichiometric air-fuel ratio $\lambda$ on condition that the torque value corresponding to the stoichiometric air-fuel ratio $\lambda$s is 100%. That is, the torque efficiency represents the efficiency. Details of the torque efficiency will be described later.

Figure 9:
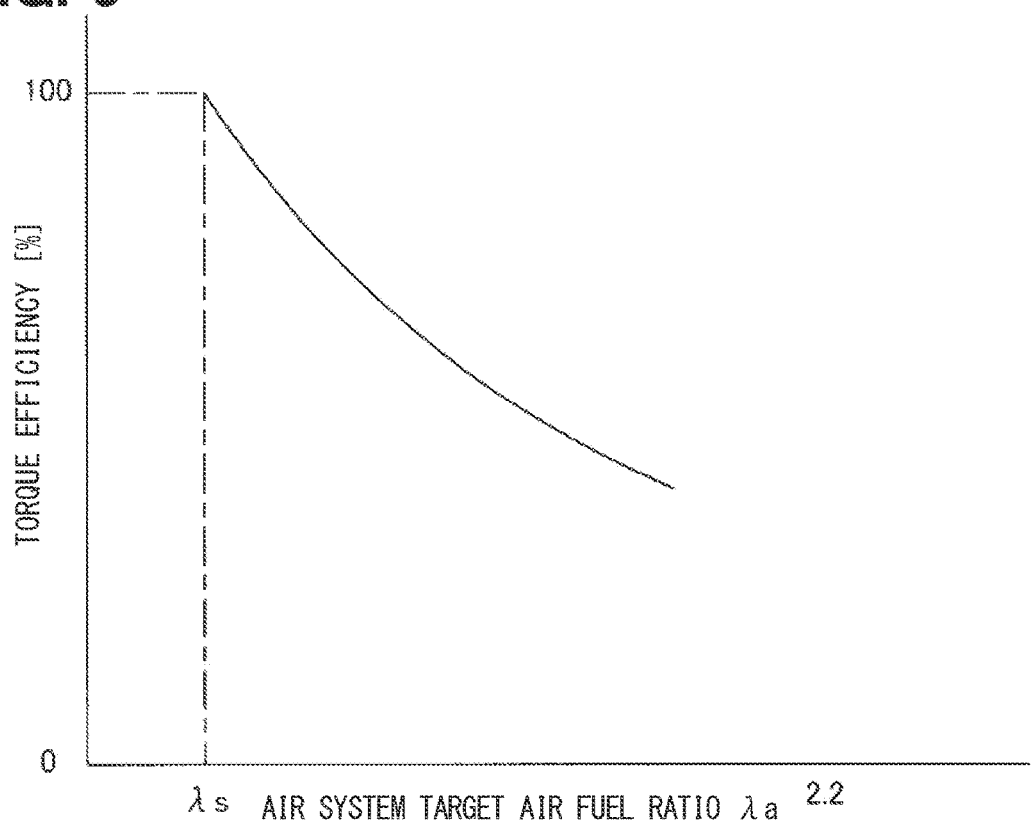
FIG. 9 is an example of a map showing a relationship between the target air-fuel ratio of the air system and a torque efficiency.

In step S102, the CPU 501 determines the target air-fuel ratio $\lambda$a of the air system by using the map shown in FIG. 7 as described above. On determining that the combustion state of the internal combustion engine is not the stoichiometric combustion (step S102: No), the CPU 501 determines the determined lean air-fuel ratio $\lambda l$ as the target air-fuel ratio $\lambda a$ of the air system (step S122). The CPU 501 determines the torque efficiency of the determined target air-fuel ratio $\lambda a$ with respect to the stoichiometric air-fuel ratio $\lambda s$ (step S124). Specifically, the CPU 501 determines the torque efficiency by using a map prepared in advance and shown in FIG. 9 that shows a relationship between the target air-fuel ratio $\lambda a$ of the air system and the torque efficiency [%]. In the present embodiment, when the required air amount is determined, a map showing a relationship between a torque corresponding to the stoichiometric air-fuel ratio $\lambda s$ and the required air amount is used, regardless of the combustion state of the internal combustion engine, that is, regardless of the air-fuel ratio $\lambda$. When the required intake amount with respect to the stoichiometric air-fuel ratio $\lambda s$, that is, the same required intake amount is used, the fuel amount becomes relatively small in order to produce the lean air-fuel ratio. As a result, the torque output by the internal combustion engine 10 operating at the lean air-fuel ratio becomes smaller than the torque output by the internal combustion engine 10 operating at the stoichiometric air-fuel ratio $\lambda s$. The relationship between the two torques is associated with a torque efficiency (lean torque/stoichiometric torque), which is a ratio representing the torque at the lean air-fuel ratio $\lambda l$ to the torque at the stoichiometric air-fuel ratio $\lambda s$. In a map shown in FIG. 9, the torque efficiency corresponding to the stoichiometric air-fuel ratio $\lambda s$ is 100%, and the torque efficiency decreases as the air-fuel ratio $\lambda$ increases.

Figure 8:
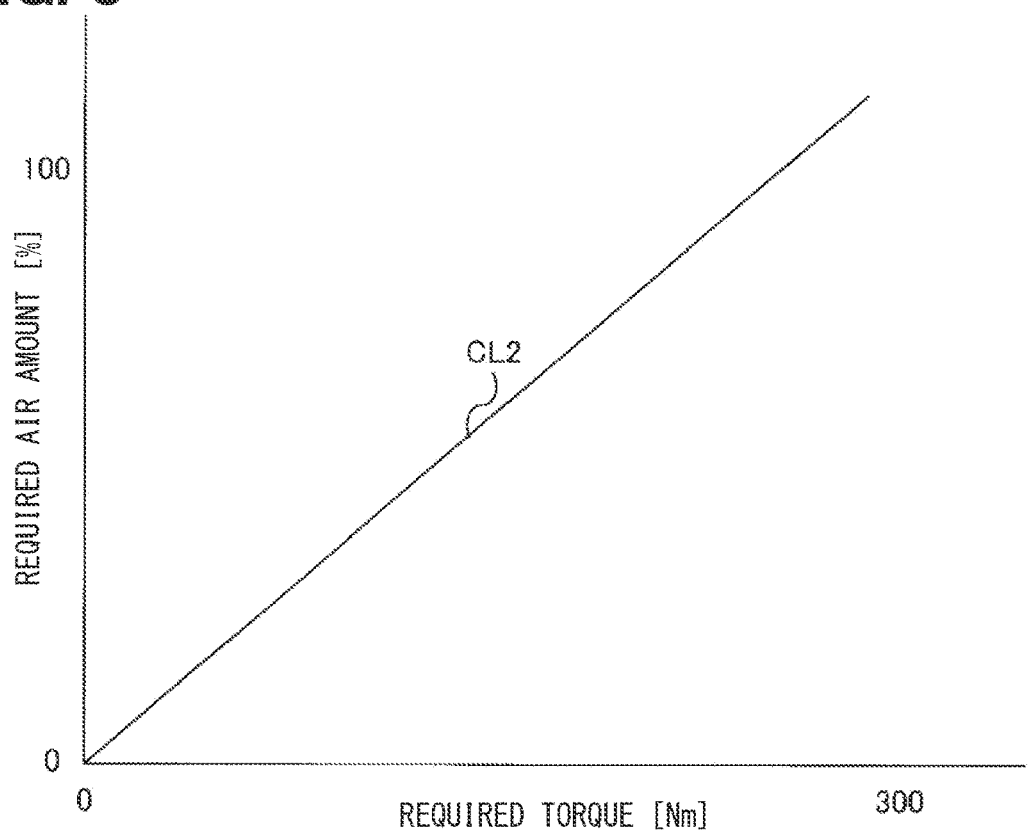
FIG. 8 is an example of a map showing a relationship between the required torque and a required air amount.

The CPU 501 uses the determined torque efficiency, and multiplies the required torque computed in step S100 by the reciprocal of the torque efficiency to correct the required torque, thereby to acquire the required air amount by using the map shown in FIG. 8 (step S126). For example, in step S122, the target air-fuel ratio of the air system $\lambda a=1.8$ corresponding to the required torque of 120 Nm is set, and in step S124, the torque efficiency=53% corresponding to $\lambda a=1.8$ is determined. The required torque of 120 Nm is multiplied by 100/53 to acquire the corrected required torque of 226 Nm. The required air amount is determined by using the acquired required torque of 226 Nm. That is, the required air amount for producing the target air-fuel ratio of the air system $\lambda a=1.8$ is determined by using the fuel amount that is for producing the required torque set in step S100.

The CPU 501 determines whether or not the combustion state of the internal combustion engine is in a transition period from the lean combustion to the stoichiometric combustion (step S128). For example, the CPU 501 may determine that it is in the transition period when the determination of the combustion state in the previous step S102 is the stoichiometric combustion or when a reference time has not elapsed since the determination of the stoichiometric combustion is made in the previous step S102. When the CPU 501 determines that it is not in the transition period (step S128: No), the CPU 501 determines the target air-fuel ratio $\lambda f$ of the injection system (step S130). Specifically, the same air-fuel ratio as the target air-fuel ratio $\lambda a$ of the air system is set to the target air-fuel ratio $\lambda f$ of the injection system, that is, $\lambda f=\lambda l$. The CPU 501 executes the ignition timing correction (step S132), and the processing routine proceeds to step S114. Specifically, the ignition timing correction value=0 is set for the base ignition timing, and the retard correction and the advance correction of the ignition timing is not executed. When the lean combustion continues, the operating state of the internal combustion engine 10, that is, the target air-fuel ratio of the air system and the air-fuel ratio of the injection system remain constant or slightly fluctuate. Therefore, large torque fluctuations do not occur, and it is not necessary to reduce the torque by retarding or advancing the ignition timing.

Figure 10:
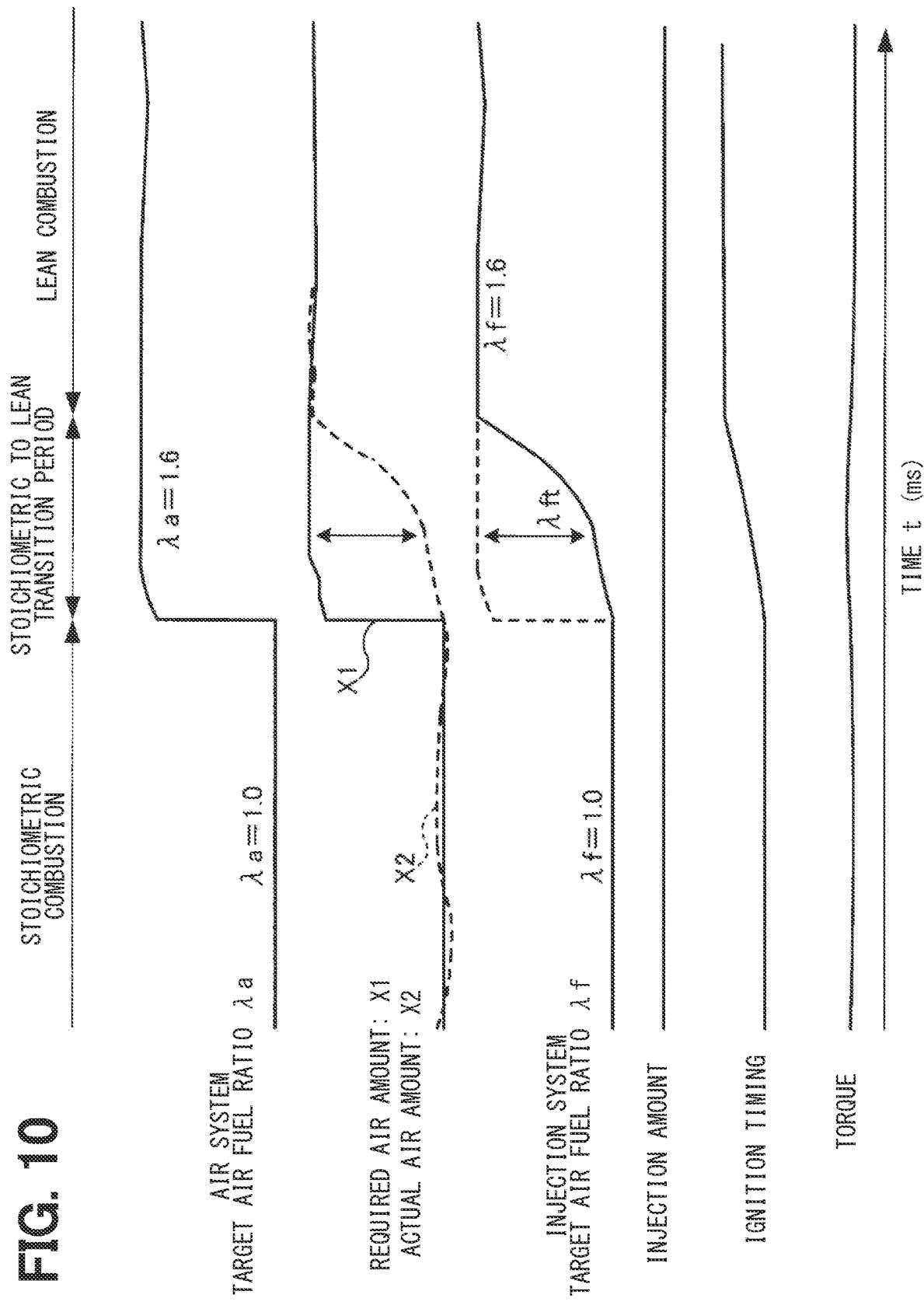
FIG. 10 is a timechart showing timewise changes in various parameters when the combustion state of the internal combustion engine shifts from the stoichiometric combustion to the lean combustion.
Figure 11:
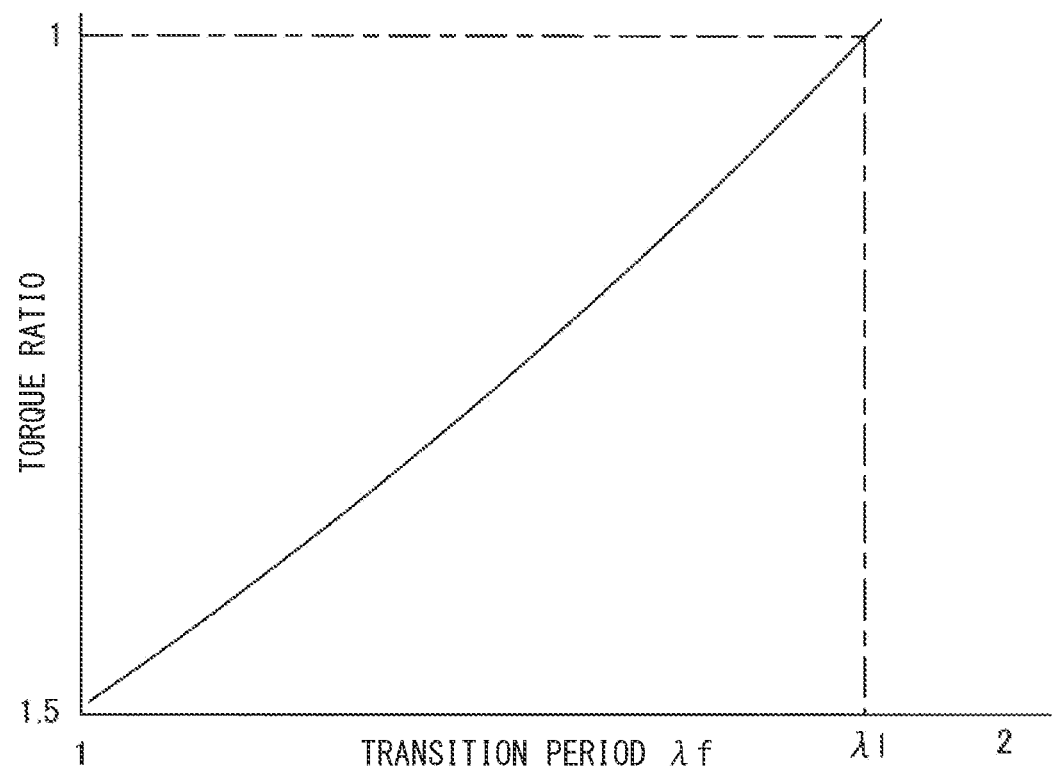
FIG. 11 is an example of a map showing a relationship between the torque ratio and the target air-fuel ratio of the injection system in a transition period.

When the CPU 501 determines in step S128 that it is in the transition period (step S128: Yes), the CPU 501 determines the target air-fuel ratio $\lambda ft$ of the injection system in the transition period (step S134). As shown in FIG. 10, the transition period determined in step S128 corresponds to the transition period from the stoichiometric combustion to the lean combustion. The target air-fuel ratio $\lambda ft$ of the injection system in the transition period is determined by performing a correction of the target air-fuel ratio $\lambda a$ of the air system in order to reduce the difference between the required torque and the actual torque. Specifically, the CPU 501 computes the ratio of the required torque to the actual torque as the correction torque ratio. The CPU 501 determines the target air-fuel ratio $\lambda ft$ of the injection system in the transition period by using the map shown as an example in FIG. 11 and prepared in advance. The map shows the relationship between the torque ratio and the target air-fuel ratio $\lambda ft$ of the injection system in the transition period. In the relationship between the torque ratio and the target air-fuel ratio $\lambda ft$ of the injection system in the transition period, the engine speed may be ignored as a factor. The actual torque and the required torque are as described above. The actual torque may be acquired by using the map showing the relationship between the actual torque and the actual air amount and the actual air amount. As described above, the actual torque in the map is the torque output from the internal combustion engine 10 under the condition that the stoichiometric air-fuel ratio $\lambda s$ is the air-fuel ratio and that the MBT is the ignition timing. Therefore, the actual torque is determined by using the actual air amount corrected by using the torque efficiency described above, that is, by using the actual air amount multiplied by the torque efficiency.

As shown in FIG. 10, during the transition period, even when the target air-fuel ratio $\lambda a$ of the air system is set to a value from 1.0 in the stoichiometric region to 1.6 in the lean region, a response delay arises in the change in the actual air amount X2. Therefore, there is a gap between the actual air amount X2 and the required amount of air X1, that is, there is a period in which air is in an insufficient amount. Therefore, in a case where the target air-fuel ratio $\lambda f$ of the injection system is immediately set to the target air-fuel ratio $\lambda a$ of the air system, an actual torque smaller than the required torque is output, and therefore, torque fluctuations due to the decrease in the torque occur. Therefore, during the transition period from the stoichiometric combustion to the lean combustion, the CPU 501 performs a correction to enrich the target air-fuel ratio $\lambda a$ of the air system and determines the target air-fuel ratio $\lambda ft$ of the injection system in the transition period. The CPU 501 suppresses the decrease in the torque that occurs, that is, executes the torque up. In the transition period from the stoichiometric combustion to the lean combustion, it becomes that the actual air amount <the required air amount as described above, and therefore, the corrected torque ratio becomes more than 1. The target air-fuel ratio $\lambda ft$ of the injection system in the transition period increases to the target air-fuel ratio fa of the air system as the time elapses. Although not shown in the example in FIG. 10, in order to avoid the condition where the target air-fuel ratio $\lambda f$ of the injection system. at which the NOx storage reduction catalyst cannot adsorb NOx, the stoichiometric air-fuel ratio $\lambda s$ may be maintained until the actual air amount becomes sufficiently close to the required air amount, and after the actual air amount becomes sufficiently close to the required air amount, a limitation may be performed to set the target air-fuel ratio λft of the injection system in the transition period to 1.3 or more.

The CPU 501 executes ignition timing correction (step S136), executes steps S114 and S116, and ends the processing routine. Shortage in torque occurs in the transition period from the stoichiometric combustion to the lean combustion. Therefore, advance angle correction is performed as ignition timing correction in order to increase torque due to ignition timing. However, ignition is performed at MBT as the base ignition timing, and no increase in torque may be expected even when the ignition timing is further advanced. Therefore, the ignition timing correction value=0 is set.

Figure 12:
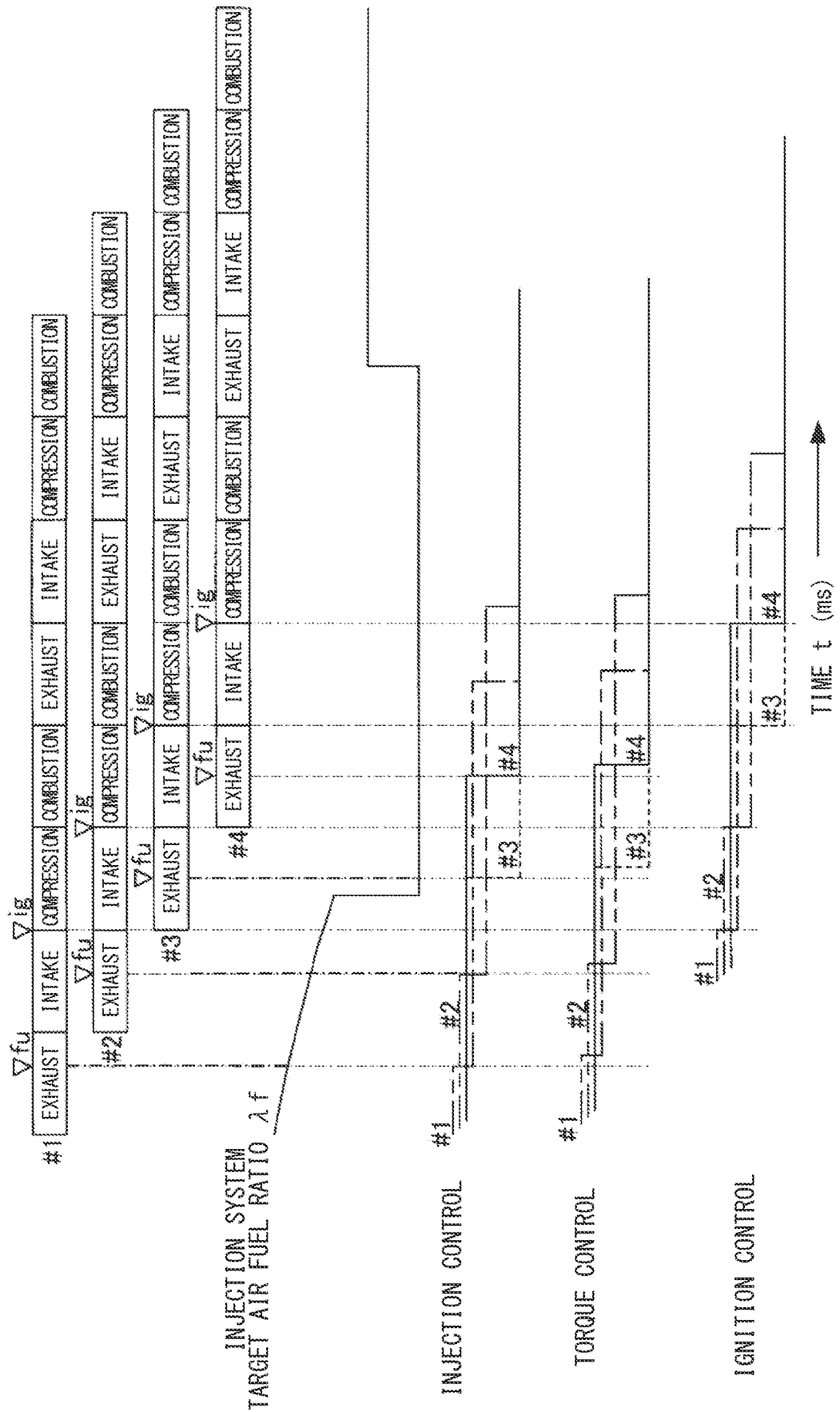
FIG. 12 is a timechart showing an injection control, a torque control and an ignition control in each cylinder of the internal combustion engine.

The target air-fuel ratio λf of the injection system, the torque efficiency, and the ignition timing described above are computed for each cylinder 111 as a unit included in the internal combustion engine 10. FIG. 12 shows an example of a 4-cylinder engine having the 1st cylinder #1, the 2nd cylinder #2, the 3rd cylinder #3, and the 4th cylinder #4. The 1st, the 2nd, the 3rd, and the 4th indicate the firing order. In FIG. 12, the sign fu indicates a timing at which an injection condition, for example, the injection amount and the injection timing, including the determination of the target air-fuel ratio λf of the injection system. The sign ig indicates a timing at which an ignition condition such as the ignition timing is determined. In FIG. 12, the injection control shows the target air-fuel ratio λf and the determination timing of the injection conditions in each cylinder #1 to #4. The torque control indicates the timing at which the torque efficiency and the retard correction value for cylinders #1 to #4 are determined. The ignition control indicates the determination timing of the ignition conditions in the cylinders #1 to #4. In the example of FIG. 12, fuel injection and spark ignition are repeatedly performed in the order of the first cylinder #1 to the fourth cylinder #4. First, the injection condition including the injection system target air-fuel ratio λf for the first cylinder #1 is determined at the timing fu. Subsequently, the torque efficiency and the retard correction value for the first cylinder #1 are determined by using the target air-fuel ratio λf of the injection system. Further, the ignition condition for the first cylinder #1 is subsequently determined by using the base ignition timing and the retard correction value. This procedure is sequentially executed in the 2nd cylinder #2, in the 3rd cylinder #3 and in the 4th cylinder #4. λs described above, in the internal combustion engine control device 500 according to the present embodiment, the target air-fuel ratio λf of the injection system is determined at each timing in each cylinder 111 as a unit, and subsequently, the torque efficiency and the retard correction value are determined. Subsequently, the ignition timing is determined. In the transition period, the target air-fuel ratio λft of the transition phase injection system is used instead of the target air-fuel ratio λf of the injection system.

In the control device 500 of the internal combustion engine according to the first embodiment described above, after determining the target air-fuel ratio λa of the air system, the target air-fuel ratio λf of the injection system is determined, and the target ignition timing is further determined. Therefore, in the transition period between the stoichiometric combustion and the lean combustion, in order to reduce the difference between the required torque and the actual torque, the torque fluctuation correction can be performed on the target air-fuel ratio λa of the air system to determine the target air-fuel ratio λft of the injection system in the transition period. As a result, the influence of the response delay of the change in the actual air amount can be reduced or eliminated, and the torque fluctuation in the transition period can be suppressed or eliminated. That is, in the internal combustion engine control device 500 according to the first embodiment, the torque fluctuation correction is performed on the target air-fuel ratio λa of the air system to reduce the difference between the required torque and the actual torque, and the target air-fuel ratio λft of the injection system is determined. Therefore, the torque control of the internal combustion engine 10 can be performed by using the target air-fuel ratio λf of the injection system that reflects the delay of the change in the actual air amount. As a result, the configuration enables to suppress or eliminate the torque increase or the torque decrease due to the difference between the change in the actual air amount and the change in the required air amount. The operating states of the internal combustion engine in the first embodiment may be homogeneous combustion, weak stratified combustion, or stratified combustion. In the case of the homogeneous combustion or the weak stratified combustion, it is possible to benefit more from the suppression of torque fluctuation.

In the control device 500 of the internal combustion engine according to the first embodiment, the required air amount in the stoichiometric combustion and the required air amount in the lean combustion are computed by using the map showing the correspondence between the torque and the required air amount at the stoichiometric air-fuel ratio λs and the map showing the correspondence between the torque and the actual air amount. Therefore, it is not necessary to prepare maps individually for the stoichiometric combustion and the lean combustion, and it is not necessary to store the maps in the memory 502. Therefore, the number of the maps can be reduced.

In the control device 500 of the internal combustion engine according to the first embodiment, during the transition period, for example, during the transition period from the lean combustion to the stoichiometric combustion, the target air-fuel ratio λf of the transition phase injection system is determined such that the target air-fuel ratio λf of the injection system in which the NOx storage reduction catalyst cannot occlude NOx is avoided. Therefore, the configuration enables to suppress or prevent decrease in the catalyst efficiency and to suppress or prevent NOx leakage even during the transition period. As a result, the configuration enables to suppress or prevent decrease in exhaust gas performance during the transition period and to maintain excellent exhaust gas performance in each combustion region.

Second Embodiment

In the first embodiment, as the air-fuel ratio limit when the target air-fuel ratio λft of the transition phase injection system is determined, the example has been described, in which the target air-fuel ratio λf of the injection system at which the NOx storage reduction catalyst is incapable of NOx storage is avoided. In the second embodiment, as the air-fuel ratio limit, a air-fuel ratio limit is performed in consideration of a misfire limit. For example, in a case where the target air-fuel ratio λft of the transitional injection system, which is acquired by lean correction as the torque fluctuation correction, is corrected to an air-fuel ratio that exceeds the misfire limit, an air-fuel ratio that does not exceed the misfire limit is set to the target air-fuel ratio λft of the transition injection system. In the second embodiment, the configuration enables to prevent or suppress misfire in the internal combustion engine 10 and to output the required torque.

Third Embodiment

The control device for the internal combustion engine according to the third embodiment is configured to coordinate the EGR control and the air-fuel ratio control. The configuration of the control device for the internal combustion engine according to the third embodiment is the same as the configuration of the control device 500 for the internal combustion engine according to the first embodiment, and therefore, the same reference numerals are given, and the description of each configuration will be omitted. In the EGR control, the opening degree of the EGR valve 35 provided to the EGR pipe 42 is controlled to change the EGR rate. The conditions for the cooperative control are as follows.

Multiple maps of the target air-fuel ratio and multiple maps of the target EGR rate are provided corresponding to the operating state of the internal combustion engine 10.

The air-fuel ratio and the EGR rate are changed for the purpose of changing the required torque or purifying the catalyst.

There is a region in which multiple combustion states are set for the same operating states of the internal combustion engine 10.

The air-fuel ratio and the EGR rate are gradually changed with respect to the target.

The target air-fuel ratio, the ignition timing, and the injection mode may be set individually.

The target air-fuel ratio and the EGR rate are set so that the combustion steadily passes through a stable region.

Figure 13:
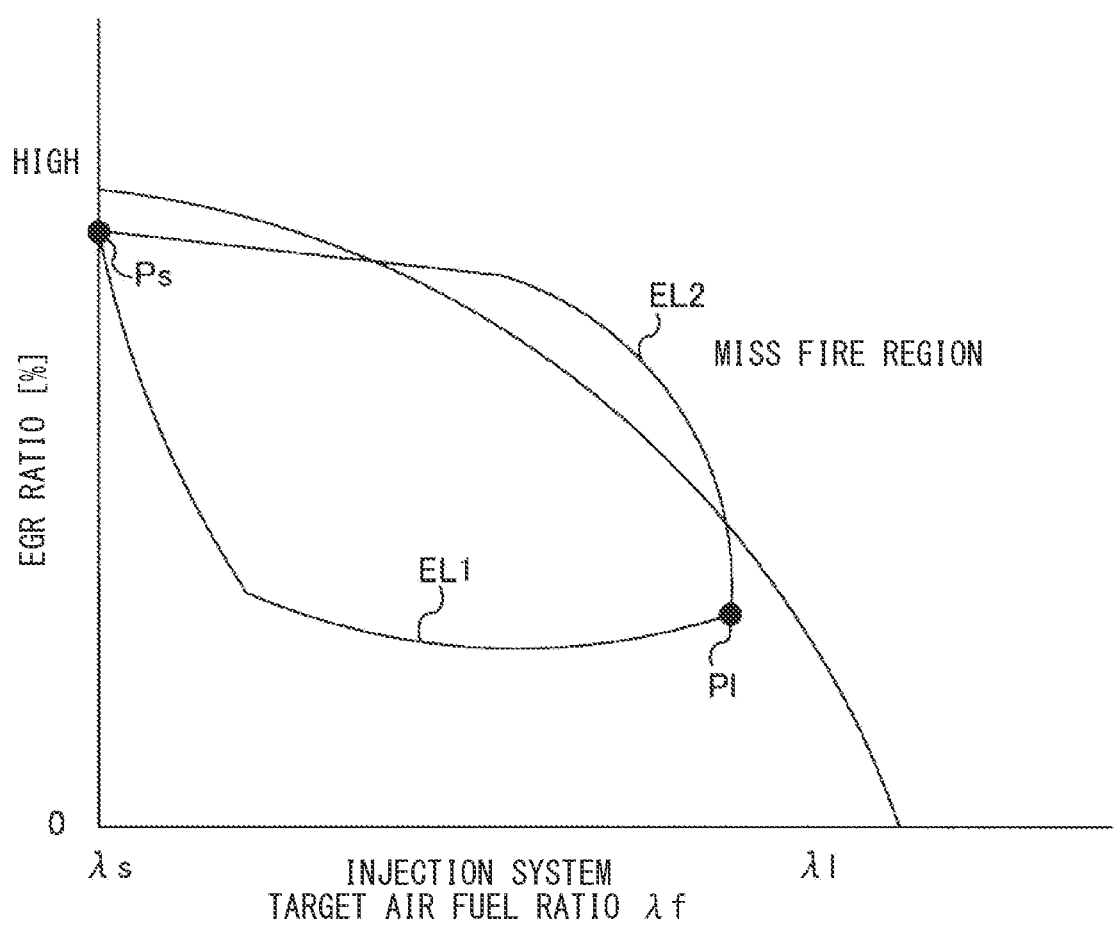
FIG. 13 is an explanatory graph showing a relationship between an EGR rate and an air-fuel ratio.

The EGR rate and the air-fuel ratio may change, for example, as shown in FIG. 13. In FIG. 13, the first point Ps indicates a stoichiometric combustion point, and the second point Pl indicates a lean combustion point. When the combustion point is changed between the stoichiometric combustion point Ps and the lean combustion point Rl, it is desirable that the EGR ratio and the air-fuel ratio change such that the combustion point does not to pass through the misfire region indicated by the characteristic line EL1. On the other hand, changes in the EGR rate and air-fuel ratio that pass through the misfire region indicated by the characteristic line EL2 should be avoided. However, the response of the EGR valve 35 is low, and the response of the exhaust gas with respect to the change in flow rate is also low. Therefore, in the transition period of the combustion state, even when a closing signal is output to the EGR valve 35, the EGR rate does not decrease immediately, and even when an open signal is output to the EGR valve 35, the EGR rate does not increase immediately. Therefore, in a case where the EGR rate and the air-fuel ratio are independently controlled based on the output of the signal, as a result, the EGR rate and the air-fuel ratio may change as shown by the characteristic line EL2.

In the third embodiment, when the combustion state of the internal combustion engine 10 is switched from the stoichiometric combustion to the lean combustion, the EGR valve 35 is first closed to reduce the EGR rate, and subsequently, the air-fuel ratio is changed. Further, when the combustion state of the internal combustion engine 10 is switched from the lean combustion to the stoichiometric combustion, the air-fuel ratio is first changed, and subsequently, the EGR valve 35 is opened to increase the EGR rate. The actual EGR rate and the air-fuel ratio change as shown by the characteristic line EL1 shown in FIG. 13 by executing the coordinated control of the EGR rate and the air-fuel ratio. To the contrary, in an existing independent control, when the combustion state of the internal combustion engine 10 is switched from the stoichiometric combustion to the lean combustion, the EGR valve 35 is closed, and the air-fuel ratio is changed. When the combustion state of the internal combustion engine 10 is switched from the lean combustion to the stoichiometric combustion, the EGR valve 35 is opened with change in the air-fuel ratio. As a result, the combustion point passes through the misfire region.

As described above, the control device 500 for the internal combustion engine according to the third embodiment cooperatively controls the EGR rate and the air-fuel ratio. Therefore, misfire in the internal combustion engine 10 is prevented or suppressed, and the required torque is output.

Other Embodiments (1) In the above embodiment, the actual air amount is controlled by adjusting the opening degree of the throttle valve 33 and the opening degree of the EGR valve 35. It is noted that, the actual air amount may be controlled by further adjusting the opening degree of the wastegate valve 34.

(2) In the above embodiment, various maps are used. It is noted that, the computation may be dynamically executed by using the acquired control parameters by using a function prepared in advance instead of the map. Further, the target air-fuel ratio $\lambda ft$ of the injection system in the transition period is determined by using the map showing the correction torque ratio and the relationship between the torque ratio and the target air-fuel ratio $\lambda ft$ of the injection system in the transition period. On the other hand, a map for associating the correction torque ratio with the target air-fuel ratio correction value of the injection system in the transition period may be prepared in advance. The target air-fuel ratio $\lambda ft$ of the injection system in the transition period may be determined by correcting the torque fluctuation of the target air-fuel ratio of the air system by adding the target air-fuel ratio correction value of the injection system acquired by using the map and the correction torque ratio to the target air-fuel ratio $\lambda a$ of the air system. Also in this case, in the transition period, the target air-fuel ratio $\lambda f$ of the injection system different from the target air-fuel ratio $\lambda a$ of the air system is used, and the advantages produced in the first embodiment can be produced.

(3) In the above embodiment, the required air amount in the stoichiometric combustion and the required air amount in the lean combustion are calculated by using the map showing the correspondence between the torque and the required air amount and the torque and the actual air amount at the stoichiometric air-fuel ratio $\lambda s$. On the other hand, a map showing the correspondence between the torque and the required air amount and the correspondence between the torque and the actual air amount corresponding to the stoichiometric combustion and the lean combustion may be used. Also in this case, torque fluctuation in the transition period can be suppressed or prevented.

(4) In the above embodiment, the CPU 501 executes the internal combustion engine control program P1 to realize the control unit that stores the detection signal in the manner of software. It is noted that, the control unit may be realized in the manner of hardware by using a pre-programmed integrated circuit or a discrete circuit.

Although the present disclosure has been described above as the embodiments and modifications, the above-described embodiments of the present disclosure are for facilitating understanding of the present disclosure and do not limit the present disclosure. The present disclosure may be modified or improved without departing from its spirit and claims, and the present disclosure includes its equivalents. For example, the technical features in each embodiment corresponding to the technical features in the form described in the summary may be used to solve some or all of the above-described problems, or to provide one of the above-described effects. In order to achieve a part or all, replacement or combination can be appropriately performed. In addition, as long as a technical feature is not described as essential in the present specification, the technical feature may be deleted as appropriate.

The invention claimed is:

1. A control device for an internal combustion engine, comprising:
an acquisition unit configured to acquire a required torque and an operating state of the internal combustion engine; and
a control unit configured to control operation of the internal combustion engine by using a required air amount, a required fuel amount, and a required ignition timing, wherein
the control unit is configured to:
determine a target air-fuel ratio of an air system according to the acquired required torque and the acquired operating state;
acquire the required air amount by using the target air-fuel ratio of the air system;
perform torque fluctuation correction on the target air-fuel ratio of the air system to determine a target air-fuel ratio of an injection system to reduce a difference between the required torque and an actual torque when a combustion state of the internal combustion engine is in a transition period between stoichiometric combustion and lean combustion;
determine the target air-fuel ratio of the injection system by using the target air-fuel ratio of the air system when the combustion state is not in the transition period; and
acquire the required fuel amount and the required ignition timing by using the determined target air-fuel ratio of the air system and the determined target air-fuel ratio of the injection system.

2. The control device for an internal combustion engine according to claim 1, wherein
the control unit is configured to perform the torque fluctuation correction by using a ratio of the required torque to the actual torque in the transition period and to determine the target air-fuel ratio of the injection system.

3. The control device for an internal combustion engine according to claim 2, wherein
the control unit is configured to perform the torque fluctuation correction to cause the target air-fuel ratio of the injection system to be lean when the transition period is a transition period from the lean combustion to the stoichiometric combustion.

4. The control device for an internal combustion engine according to claim 3, wherein
the control unit is configured to acquire a retard correction value of the ignition timing by using the ratio of the required torque and the actual torque and control operation of the internal combustion engine by using the required ignition timing and the retard correction value, when the transition period is a transition period from the lean combustion to the stoichiometric combustion.

5. The control device for an internal combustion engine according to claim 2, wherein
the control unit is configured to perform the torque fluctuation correction to cause the target air-fuel ratio of the injection system to be rich when the transition period is a transition period from the stoichiometric combustion to the lean combustion.

6. The control device for an internal combustion engine according to claim 1, wherein
the control unit is configured to:
acquire the required air amount by using a relationship between a torque and the required air amount corresponding to the air-fuel ratio for the stoichiometric combustion determined in advance and a torque corresponding to the target air-fuel ratio of the air system;
acquire a torque efficiency of the torque corresponding to the target air-fuel ratio of the air system that is based on the torque corresponding to the air-fuel ratio for the stoichiometric combustion, when the combustion state is in the lean combustion; and
acquire the required air amount by using the acquired torque efficiency and the relationship.

7. The control device for an internal combustion engine according to claim 1, wherein
the control unit is configured to perform the torque fluctuation correction by using a ratio of the required air amount to the actual air amount in the transition period and to determine the target air-fuel ratio of the injection system.

8. The control device for an internal combustion engine according to claim 1, wherein
the control unit is further configured to change the target air-fuel ratio of the injection system, on which the torque fluctuation correction has been performed, to restrict or prevent at least one of reduction in an efficiency of an exhaust gas catalyst, misfire, and deterioration in a property of the exhaust gas.

9. A control method for an internal combustion engine, comprising:
acquiring a required torque and an operating state of the internal combustion engine;
determining a target air-fuel ratio of an air system according to the acquired required torque and the acquired operating state;
acquiring an required air amount by using the target air-fuel ratio of the air system;
performing torque fluctuation correction on the target air-fuel ratio of the air system to determine a target air-fuel ratio of an injection system to reduce a difference between the required torque and an actual torque when a combustion state of the internal combustion engine is in a transition period between stoichiometric combustion and lean combustion;
determining the target air-fuel ratio of the injection system by using the target air-fuel ratio of the air system when the combustion state is not in the transition period;
acquiring a required fuel amount and a required ignition timing by using the determined target air-fuel ratio of the air system and the determined target air-fuel ratio of the injection system; and controlling operation of the internal combustion engine by using the acquired required air amount, the acquired required fuel amount, and the acquired required ignition timing.

10. A control device for an internal combustion engine, comprising:

at least one processor configured to:

acquire a required torque and an operating state of the internal combustion engine;

determine a target air-fuel ratio of an air system according to the acquired required torque and the acquired operating state;

acquire a required air amount by using the target air-fuel ratio of the air system;

perform torque fluctuation correction on the target air-fuel ratio of the air system to determine a target air-fuel ratio of an injection system to reduce a difference between the required torque and an actual torque when a combustion state of the internal combustion engine is in a transition period between stoichiometric combustion and lean combustion;

determine the target air-fuel ratio of the injection system by using the target air-fuel ratio of the air system when the combustion state is not in the transition period;

acquire a required fuel amount and a required ignition timing by using the determined target air-fuel ratio of the air system and the determined target air-fuel ratio of the injection system; and control operation of the internal combustion engine by using the acquired required air amount, the acquired required fuel amount, and the acquired required ignition timing.

\* \* \* \* \*